(12) United States Patent
Kalavai

(10) Patent No.: US 8,743,695 B1
(45) Date of Patent: Jun. 3, 2014

(54) TRANSMISSION CHANNEL FEEDBACK IN A WIRELESS NETWORK

(76) Inventor: Raghunath Kalavai, Bedminster, NJ (US)

(*) Notice: Subject to any disclaimer, the term of this patent is extended or adjusted under 35 U.S.C. 154(b) by 64 days.

(21) Appl. No.: 13/483,041

(22) Filed: May 29, 2012

Related U.S. Application Data

(60) Provisional application No. 61/490,213, filed on May 26, 2011, provisional application No. 61/526,549, filed on Aug. 23, 2011.

(51) Int. Cl.
 H04J 1/16 (2006.01)
 H04W 4/00 (2009.01)

(52) U.S. Cl.
 CPC ... *H04J 1/16* (2013.01); *H04W 4/00* (2013.01)
 USPC .................. 370/236; 370/329; 370/332

(58) Field of Classification Search
 CPC .................. H04J 1/16; H04W 4/00
 USPC .................. 370/329, 236, 332
 See application file for complete search history.

(56) References Cited

U.S. PATENT DOCUMENTS

2011/0044376 A1* 2/2011 Lin et al. ............ 375/130

* cited by examiner

*Primary Examiner* — Sai-Ming Chan

(57) ABSTRACT

The present invention relates to a method to improve the communication performance of a network of transceivers stations. The method comprises of a plurality of transceiver stations transmitting signals to each other, calculating the channel for the signal received at one station, and then conveying the information about the channel to the transmitting station.

8 Claims, 5 Drawing Sheets

302 — Station U estimates the channel H2 from pilots received from station A, and interpolates it for all sub-carriers 304 — Station U transmits special pilots p/H2 in pre-defined slots, in addition to standard pilots p 306 — Station A estimates H1 from the received regular pilots and H1/H2 from special pilots 308 — Station A interpolates H1 and H1/H2 to all sub-carriers. It then calculates H2 for all sub-carriers

TRANSMISSION CHANNEL FEEDBACK IN A WIRELESS NETWORK

CROSS-REFERENCE TO RELATED APPLICATIONS

This application claims the benefit of PPA application number 61490213 (EFS ID 10174606) filed 26 May, 2011, by the present inventor, which is incorporated by reference. This application also claims the benefit of PPA application number 61526549 (EFS ID 10797313) filed 23 Aug., 2011, by the present inventor, which is also incorporated by reference.

FEDERALLY SPONSORED RESEARCH

None

SEQUENCE LISTING

None

FIELD OF INVENTION

The present invention relates to a method to improve the wireless communication performance of a network of transceiver stations. In particular the present invention relates to improving the communication performance when a plurality of transceiver stations are transmitting signals to the same target transceiver station.

BACKGROUND

Demand on cellular network capacity is growing very fast with the growth of smart phones and the wide usage of video applications. There are projections that the data traffic on the cellular wireless system will grow by 26× in 5 years. At the same time the revenue per bit ($/MByte) for service providers is going down. With spectrum being limited and expensive, capacity has to be increased by squeezing more bits into the same bandwidth. Long term Evolution (LTE) standard from the 3GPP standard body has improved the amount of data that can be packed in a given bandwidth (bits/Hz), but the improvement is incremental. The standards body 3GPP has charted out a few schemes to improve the capacity of the system, such as, Beamforming, MIMO, MU-MIMO (or network MIMO) coordinated multi-point systems (CoMP) (see 3GPP standards documents, including 3GPP TS 36.211: "Evolved Universal Terrestrial Radio Access (E-UTRA); Physical channels and modulation"). The recent book "LTE—The UMTS Long Term Evolution from theory to practice" by S. Sesia et al (Wiley 2011), gives a good background on the subject. The other approach to improve capacity is to use small cells (Pico cells, Femto cells). By more frequency reuse capacity can potentially be improved. However, apart from increasing infrastructure costs, small cells exacerbate interference between cells, and cell edge coverage becomes a bottleneck. All these techniques have practical limitations and these have to be fixed before any large capacity growth is possible.

The transmit channel is the channel for the signal path from the transmitter to the receiver. The transmit channel can be estimated at the receiver. However, the transmit channel is not known at the transmitter. If the transmit channel information is available at the transmitter then it can optimize the signal transmission to match its channel. In many cases the receiver station may not be able to send back the channel information due to constraints on bandwidth.

SUMMARY

According to one aspect, a method of exchanging auxiliary information, among a set of stations, including a plurality of stations, comprising, forming scaling factors based on said auxiliary information, combining the scaling factors with signals being transmitted from the stations in the set of stations, receiving the signals at the other stations in the set of station, and recovering the said auxiliary information.

According to one aspect, the said auxiliary information is related to wireless signal condition.

According to one aspect, the transmission signal consists of a plurality of sub-carriers, and, a subset of the sub-carrier signals are combined with the scaling factors, and, the auxiliary information is extracted at the receiving station based on the difference in the interpolated estimate of channel due to the scaling factor.

According to one aspect, said set of stations consists of two stations, and comprises, scaling a pre-determined subset of sub-carriers of signals transmitted from the first station, by scaling factors that are based on said auxiliary information, recovering the transmitted auxiliary information at the second station by, using pilots in the sub-carriers that are not scaled by said scaling factors, using interpolation techniques, to decode the transmission channel for all sub-carriers, using pilots in the sub-carriers that are scaled by said scaling factors, using interpolation techniques, to decode the transmission channel for all sub-carriers, extracting the scaling factors by comparing the transmission channel in the previous two steps.

According to one aspect, station U represents the first station, and station A represents the second station, and station U transmits signals to station A over a wireless channel represented as H1, and station A transmits signals to station U over a wireless channel represented as H2, wherein, station U estimates the channel H2, using pilots in the signal, and interpolates it, to obtain estimate of H2 for plurality of sub-carriers, and, station U transmits data to station A by scaling a subset of sub-carriers by a scaling factor that is related to H2, and represented by f(H2), and, station A estimates the channel H1 from pilots in sub-carriers that are not scaled, and estimates H1*f(H2) from pilots in the sub-carriers that are scaled, and then interpolates these quantities over the plurality of sub-carriers, to obtain an estimate of H1 and H1*f(H2) for the plurality of sub-carriers, and, station A calculates an estimate of f(H2) for the plurality of sub-carriers, and optionally estimates H2 from it.

According to another aspect, station A after estimating value of f(H2), scales the sub-carriers in the signal it transmits to station U by a scaling factor related to f(H2).

According to one aspect, station A is communicating with stations other than station U, over different sets of sub-carriers, and the other stations processes signals using the approach of station U, for corresponding set of sub-carriers.

According to one aspect, the signaling is based on single-carrier system, and, the scaling factor is implemented as a time-domain filter, with the auxiliary information embedded in the coefficients of the filter, and the scaling factor is applied to a predetermined subset of signals, enabling the receiving station to estimate the auxiliary information based on the difference in the signal with and without the scaling factor.

According to one aspect, a method of exchanging auxiliary information, among a set of stations, including a plurality of stations, comprising, forming scaling factors based on said auxiliary information, combining the scaling factors with special pilots in the signals being transmitted from the stations in the set of stations, receiving the signals at the other stations in the set of station, and recovering the said auxiliary information.

According to one aspect, the auxiliary information is related to the wireless signal conditions.

According to one aspect, there are two stations in the set of stations, station A and station U, and the station U transmits signals to a station A over a wireless channel represented as H1, and the station A transmits signals to the station U over a wireless channel represented as H2, wherein, station U estimates the channel H2, using pilots in the signal, and interpolates it, to obtain estimate of H2 for plurality of sub-carriers, and, station U transmits data to station A by sending special pilots scaled by a scaling factor that is related to H2, and represented by f(H2), and, station A estimates the channel H1 from the regular pilots, and estimates H1*f(H2) from special pilots, and then interpolates these quantities over the plurality of sub-carriers, to obtain an estimate of H1 and H1*f(H2) for the plurality of sub-carriers, and, station A calculates as estimate of f(H2), and in some instances an estimate of H2, for the plurality of sub-carriers.

According to one aspect, station A after estimating value of f(H2), scales the sub-carriers in the signal it transmits to station U by a scaling factor related to f(H2).

According to one aspect, station A is communicating with stations other than station U, over different set of sub-carriers, and the other stations processes signals using the approach of station U, for corresponding set of sub-carriers.

According to one aspect a method of feeding back information about transmit channel conditions between two stations, for plurality of sub-carriers, comprising, scaling signals transmitted from each of the stations to the other station by scaling factors at predetermined regular scaling time interval, with the scaling applied at the same time in both stations, updating the said scaling factors based on changes in the channel of signal received from the other, since the last scaling time, with scaling factor set to unity at initialization.

DRAWINGS

DETAILED DESCRIPTION

First Embodiment

Figure 1:
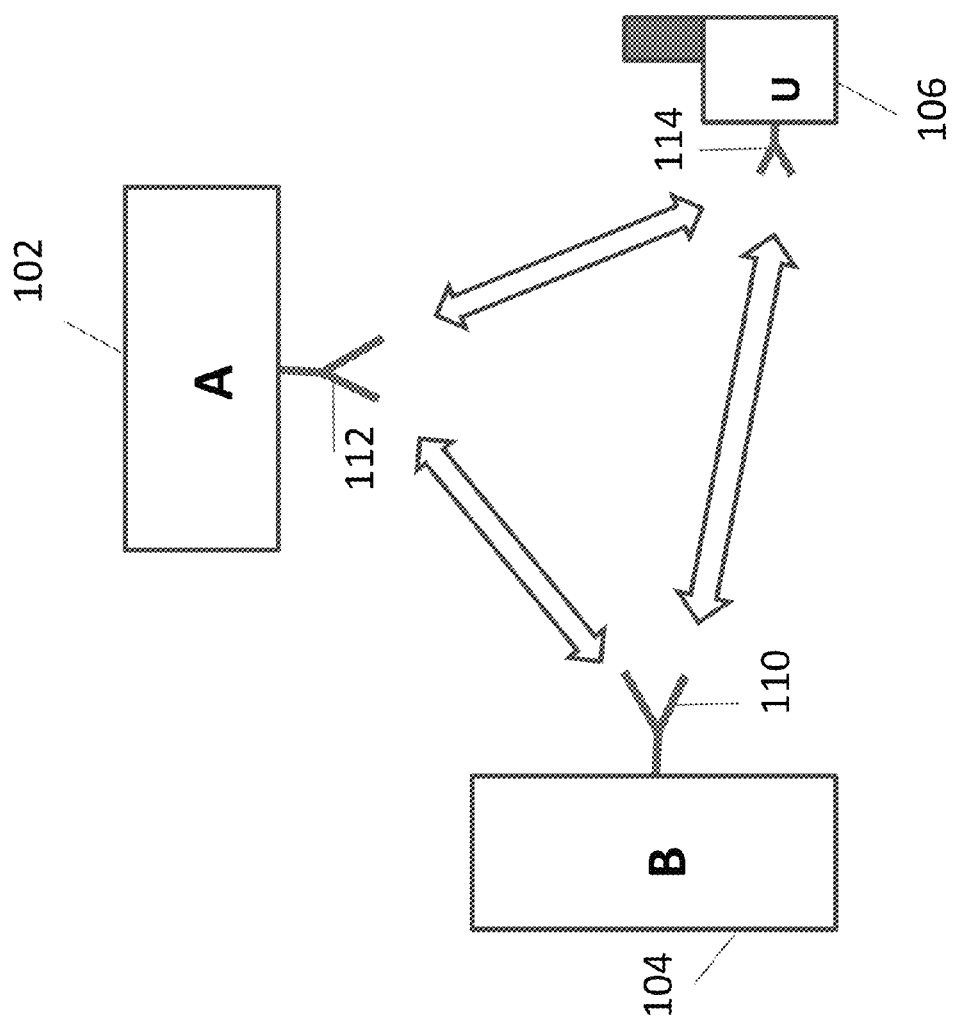
FIG. 1 is a diagram that illustrates an example configuration of a wireless communication network.

FIG. 1 illustrates three nodes, station A 102, station B 104 and station U 106, communicating over a wireless communication network. In this example each of the stations has an antenna for wireless communication of signal. The antennas for stations A, B and C are represented as 112, 110 and 114, respectively, in the figure. All three stations are transceivers, and can hence transmit and receive data over the air.

Figure 2:
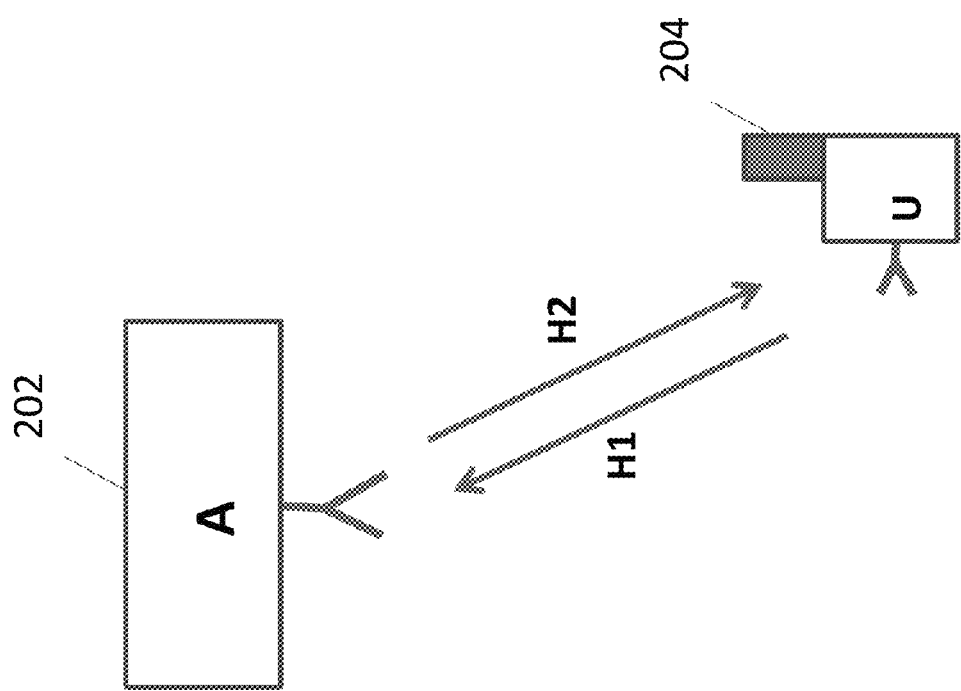
FIG. 2 shows an example of a communication link between two stations

FIG. 2 is an illustration of the channel between station A, 202, and station U, 204. The transmission channel represents the transformation of a signal sent from one station to the other. In FIG. 2, the channel from station A to station U is represented as H1, and the channel from station U to station A is represented as H2. In one embodiment the wireless communication is based on OFDM (orthogonal frequency division multiplexing) modulation. In OFDM the signals are transmitted over multiple sub-channels or sub-carriers in the frequency domain In OFDM transmission every sub-carrier or sub-channel will have an associated channel. Hence H1 and H2 refer to the channel for a sub-carrier in the OFDM signal.

In OFDM a known pilot signal is used in some cases to aid in channel estimation. When a pilot signal p (also known as training or reference signal) is transmitted from station A to station U on a sub-carrier, the received signal at station U can be represented by p*H2, where H2 represents the channel for that sub-carrier, and * represents a multiplication operation. Since p is a known quantity, H2 can be estimated in station U from the received pilot signal. Note that the pilots are sent on some of sub-carriers and only for some of the frames (this arrangement is pre-determined). The channel for all other sub-carriers is determined via interpolation. Typically, interpolation and averaging is done over sub-carriers and over multiple OFDM blocks. Thus station U determines the received channel for every sub-carrier. Similarly, the channel estimates H1 can be estimated in station A for every sub-carrier.

Figure 3:
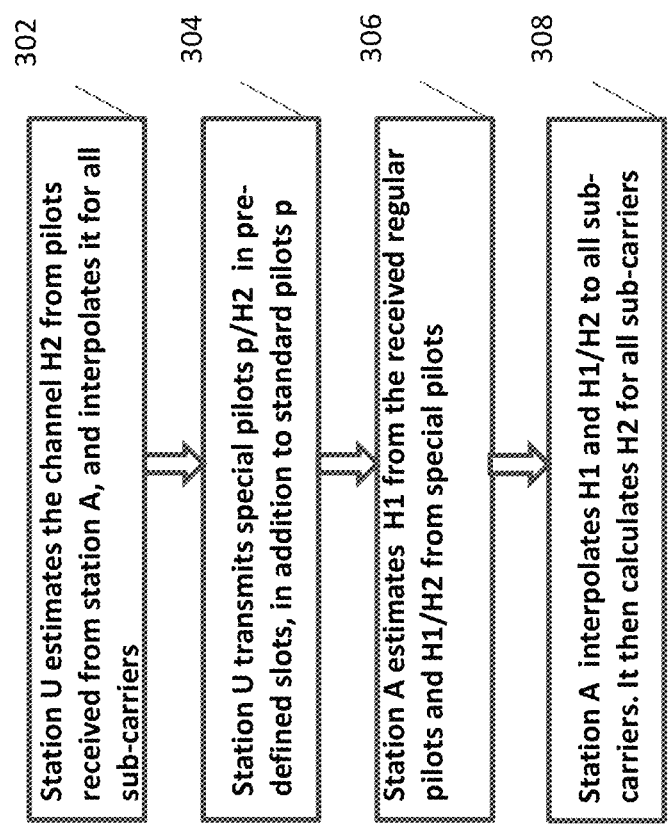
FIG. 3 shows the exemplary steps for the first embodiment

FIG. 3 details some aspects of the first exemplary embodiment. Communication between station A and station U is used as an example. The station U calculates the channel for the receive path H2 based on the received pilot data from station A, as shown in step 302. Note that this refers to one exemplary sub-carrier in the OFDM signal. Station U transmits the regular pilots in pre-allocated sub-carriers and at pre-allocated time slots (or OFDM blocks). In addition station U transmits special pilots p/H2 in a different set of pre-arranged time slots and sub-carriers. Here H2 represents the channel from station A to station U for the corresponding sub-carrier from which this special pilot is sent. Hence station U is sending the received channel for that particular sub-channel back to station A. This is shown in step 304. The regular pilots from station U received by station A will be of the form H1*p (after passing through the channel H1). Thus the station can determine channel H1 from the regular pilots. The special pilots received will be of the form H1*p/H2. Hence station A can estimate H1/H2 for the special pilot sub-carrier locations (as shown in step 306). By interpolation station A estimates H1 and H1/H2 for every sub-carrier. The value of H2 is calculated from these two values for every sub-carrier in the ofdm signal. Thus station A now knows the channel for data it transmits to station U. This knowledge is useful for station A to optimally transmit signals or coordinate with other stations transmitting at the same time to station U.

This is an exemplary method of calculations. There are other ways of doing the calculations. The value of H1 can be calculated and interpolated for all the sub-carriers. Next the value of H2 can be calculated for the special pilot locations. Next the value of H2 can be interpolated to other sub-carriers.

Figure 4:
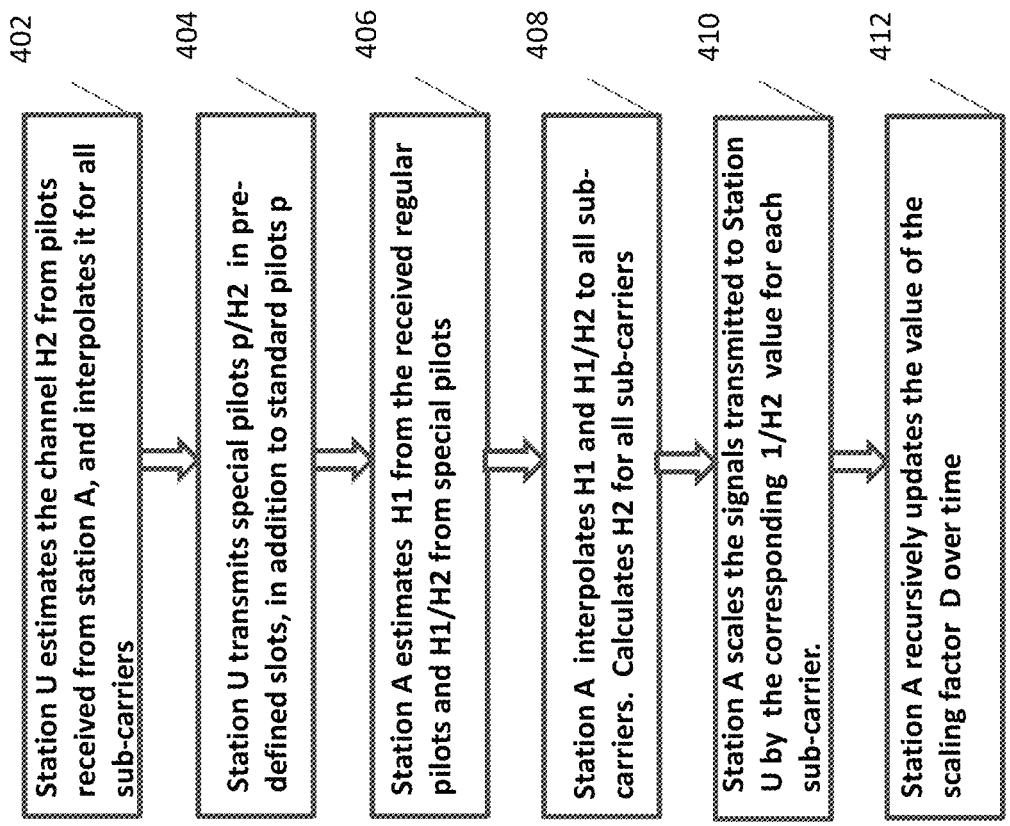
FIG. 4 shows the exemplary steps for the second embodiment

FIG. 4 details some more aspects of the first exemplary embodiment. Communication between station A and station U is used as an example. The steps 402, 404, 406, 408 are similar to the first embodiment steps in FIG. 3 of 302, 304, 306, 308. After calculating H1 and H2 for all the sub-carriers, station A scales the signals transmitted to station U by the corresponding D=1/H2. This has the effect of trying to cancel out the effects of the channel. Note that variations in the channel conditions with time will mean that the channel will not get cancelled out. Station A calculates the scaling factor recursively.

Some aspects of the recursive update procedure are shown below. Consider one sub-carrier for which the value of 1/H2 is calculated at iteration "n". The value of 1/H2 at iteration n is designated as D(n)

D(n)=value of 1/H2 determined by station A at time iteration n.

The value by which station A scales the transmit signals at iteration n is designed as G(n).

The first time D(n) and G(n) are calculated, say at iteration n=0,

G(0)=D(0)

The next time that G(n) is updated, say at iteration 1, it is updated recursively as

G(1)=G(0)*D(1)

And so on. So at iteration n

G(n)=G(n−1)*D(n)

There should be sufficient time allowed between iterations so that the value of D(n) has settled. The time constants should be experimentally varied to get the best results.

There are different variations to this scheme. The above is an exemplification of some aspects of the embodiment. Next various aspects of the embodiment are discussed.

According to one aspect, a method of exchanging auxiliary information, among a set of stations, including a plurality of stations, comprising, forming scaling factors based on said auxiliary information, combining the scaling factors with special pilots in the signals being transmitted from the stations in the set of stations, receiving the signals at the other stations in the set of station, and recovering the said auxiliary information.

According to one aspect, the auxiliary information is related to the wireless signal conditions.

According to one aspect, there are two stations in the set of stations, station A and station U, and the station U transmits signals to a station A over a wireless channel represented as H1, and the station A transmits signals to the station U over a wireless channel represented as H2, wherein, station U estimates the channel H2, using pilots in the signal, and interpolates it, to obtain estimate of H2 for plurality of sub-carriers, and, station U transmits data to station A by sending special pilots scaled by a scaling factor that is related to H2, and represented by f(H2), and, station A estimates the channel H1 from the regular pilots, and estimates H1*f(H2) from special pilots, and then interpolates these quantities over the plurality of sub-carriers, to obtain an estimate of H1 and H1*f(H2) for the plurality of sub-carriers, and, station A calculates as estimate of f(H2), and in some instances an estimate of H2, for the plurality of sub-carriers.

According to one aspect, station A after estimating value of f(H2), scales the sub-carriers in the signal it transmits to station U by a scaling factor related to f(H2). The example of FIG. 4 is using f(H2)=1/H2 to scaled the special pilots from station U, and station A transmits signals by scaling them by 1/H2.

According to one aspect, station A is communicating with stations other than station U, over different set of sub-carriers, and the other stations processes signals using the approach of station U, for corresponding set of sub-carriers.

Second Embodiment

Figure 5:
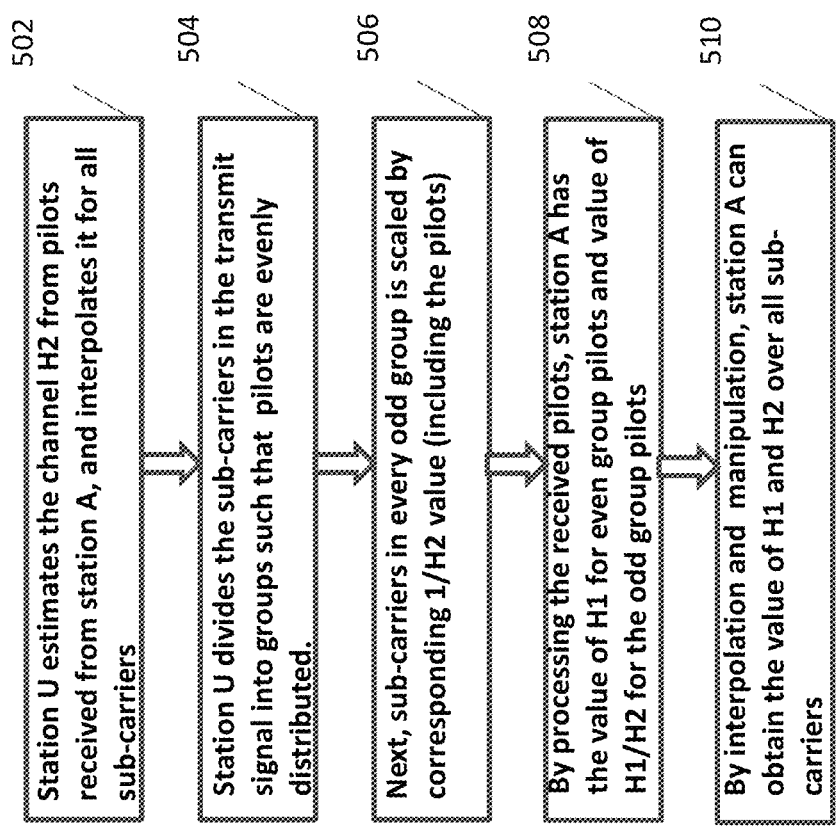
FIG. 5 shows the exemplary steps for the third embodiment

Some aspects of the third embodiment are presented in FIG. 5. Communication between station A and station U is used as an example. Station U estimates the channel H2 from the pilots received from station A, and interpolates it to every sub-carrier (step 502). Station U divides the transmit signal into groups of sub-carriers (equal groups as far as possible). One exemplary scheme is to make sure that each group is covered by one pilot signal. If this requirement cannot be met for certain patterns of pilot distribution, then groups could be chosen where pilots are evenly distributed (step 504). Data on sub-carriers in every alternate group (call these the odd groups) is scaled by corresponding 1/H2 value for the sub-carrier. This scaling is done on the pilot signal also. The other groups (call these the even groups) are sent without any scaling. The grouping structure and scaling scheme is pre-determined and known to station A. When station A receives the pilots from station U, it can calculate the value of H1 for the even group pilots, and H1/H2 for the odd group pilots (step 508). By interpolating it can calculate the value of H1 and H1/H2 for all sub-carriers. By simple calculations station A can calculate the value of H1 and H2 for all the sub-carriers.

According to one aspect, a method of exchanging auxiliary information, among a set of stations, including a plurality of stations, comprising, forming scaling factors based on said auxiliary information, combining the scaling factors with signals being transmitted from the stations in the set of stations, receiving the signals at the other stations in the set of station, and recovering the said auxiliary information.

According to one aspect, the said auxiliary information is related to wireless signal condition.

According to one aspect, the transmission signal consists of a plurality of sub-carriers, and, a subset of the sub-carrier signals are combined with the scaling factors, and, the auxiliary information is extracted at the receiving station based on the difference in the interpolated estimate of channel due to the scaling factor.

According to one aspect, said set of stations consists of two stations, and comprises, scaling a pre-determined subset of sub-carriers of signals transmitted from the first station, by scaling factors that are based on said auxiliary information, recovering the transmitted auxiliary information at the second station by, using pilots in the sub-carriers that are not scaled by said scaling factors, using interpolation techniques, to decode the transmission channel for all sub-carriers, using pilots in the sub-carriers that are scaled by said scaling factors, using interpolation techniques, to decode the transmission channel for all sub-carriers, extracting the scaling factors by comparing the transmission channel in the previous two steps.

According to one aspect, station U represents the first station, and station A represents the second station, and station U transmits signals to station A over a wireless channel represented as H1, and station A transmits signals to station U over a wireless channel represented as H2, wherein, station U estimates the channel H2, using pilots in the signal, and interpolates it, to obtain estimate of H2 for plurality of sub-carriers, and, station U transmits data to station A by scaling a subset of sub-carriers by a scaling factor that is related to H2, and represented by f(H2), and, station A estimates the channel H1 from pilots in sub-carriers that are not scaled, and estimates H1*f(H2) from pilots in the sub-carriers that are scaled, and then interpolates these quantities over the plurality of sub-carriers, to obtain an estimate of H1 and H1*f(H2) for the plurality of sub-carriers, and, station A calculates an estimate of f(H2) for the plurality of sub-carriers, and optionally estimates H2 from it.

According to another aspect, station A after estimating value of f(H2), scales the sub-carriers in the signal it transmits to station U by a scaling factor related to f(H2).

According to one aspect, station A is communicating with stations other than station U, over different sets of sub-carriers, and the other stations processes signals using the approach of station U, for corresponding set of sub-carriers.

According to one aspect, the signaling is based on single-carrier system, and, the scaling factor is implemented as a time-domain filter, with the auxiliary information embedded in the coefficients of the filter, and the scaling factor is applied to a predetermined subset of signals, enabling the receiving station to estimate the auxiliary information based on the difference in the signal with and without the scaling factor.

Third Embodiment

According to one aspect a method of feeding back information about transmit channel conditions between two stations, for plurality of sub-carriers, comprising, scaling signals transmitted from each of the stations to the other station by scaling factors at predetermined regular scaling time interval, with the scaling applied at the same time in both stations, updating the said scaling factors based on changes in the channel of signal received from the other, since the last scaling time, with scaling factor set to unity at initialization.

Consider the configuration of FIG. 2. The steps in matching the channels between A and U can be as given below:

1. S(A,n) is the scaling factor at station A for signals transmitted to U at time n, and S(U,n) is the scaling factor at station U at time n. At initialization i.e. time=0, S(A,0)=1, and S(U,0)=1. An exemplary sub-carrier calculations are shown here.
2. Next at time=1, the receive channels are calculated as H1, and scaling factor as S(A,1)=1/H1, and similarly S(U,1)=1/H2, and the transmit signals are scaled by these values. After scaling the channel for received signal at U is H2/H1 and the channel for received signal at station A is H1/H2
3. From time=1 to time=2, let us say that receive channel at station A changes by (1+d1) i.e. the channnen seen by it is H1(1+d1)/H2. Similarly the channel seen by station U is H2(1+d2)/H1.
4. At time 2 the scaling factor at station A is updated to S(A,2)=S(A,1)/(1+d1)=1/(H1*(1+d1)), and similarly S(U,2)=S(U,1)/(1+d2)=1/(H2*(1+d2)). Thus the match is still maintained, and this process is repeated.

Notes

In some of the above embodiments there is an assumption that the number of sub-carriers is the same in the transmit and receive directions. If this assumption is not true, then a mapping can be made from sub-carriers in receive to sub-carriers in transmit direction, so that the algorithm is still applicable.

Scope

Thus the reader will see that at least one embodiment provides a method for a station to estimate the channel for the signal it transmits to another station. While the above description contains much specificity, these should not be construed as limitations on the scope, but rather as an exemplification of several embodiments thereof.

Accordingly, the scope should not be limited by the embodiments illustrated.

The invention claimed is:

1. A method of exchanging auxiliary information between two stations, wherein, the transmission signal consists of a plurality of sub-carriers and the auxiliary information is related to wireless signal condition, and comprises,
    a. scaling a pre-determined subset of sub-carriers of signals transmitted from the first station, by scaling factors that are based on said auxiliary information,
    b. recovering the transmitted auxiliary information at the second station by,
        i. using pilots in the sub-carriers that are not scaled by said scaling factors, using interpolation techniques, to decode the transmission channel for all sub-carriers,
        ii. using pilots in the sub-carriers that are scaled by said scaling factors, using interpolation techniques, to decode the transmission channel for all sub-carriers,
        iii. extracting the scaling factors by comparing the transmission channel in the previous two steps.

2. The method of claim 1 wherein station U represents the first station, and station A represents the second station, and station U transmits signals to station A over a wireless channel represented as H1, and station A transmits signals to station U over a wireless channel represented as H2, wherein,
    a. station U estimates the channel H2, using pilots in the signal, and interpolates it, to obtain estimate of H2 for plurality of sub-carriers, and,
    b. station U transmits data to station A by scaling a subset of sub-carriers by a scaling factor that is related to H2, and represented by f(H2), and,
    c. station A estimates the channel H1 from pilots in sub-carriers that are not scaled, and estimates H1*f(H2) from pilots in the sub-carriers that are scaled, and then interpolates these quantities over the plurality of sub-carriers, to obtain an estimate of H1 and H1*f(H2) for the plurality of sub-carriers, and,
    d. station A calculates an estimate of f(H2) for the plurality of sub-carriers, and optionally estimates H2 from it.

3. The method of claim 2 wherein station A after estimating value of f(H2), scales the sub-carriers in the signal it transmits to station U by a scaling factor related to f(H2).

4. The method of claim 2 wherein station A is communicating with stations other than station U, over different sets of sub-carriers, and the other stations processes signals using the approach of station U, for corresponding set of sub-carriers.

5. The method of claim 1 wherein,
    a. the signaling is based on single-carrier system, and,
    b. the scaling factor is implemented as a time-domain filter, with the auxiliary information embedded in the coefficients of the filter, and
    c. the scaling factor is applied to a predetermined subset of signals, enabling the receiving station to estimate the auxiliary information based on the difference in the signal with and without the scaling factor.

6. A method of exchanging auxiliary information between two stations, station A and station U, wherein, the auxiliary information is related to wireless signal condition and the station U transmits signals to station A over a wireless channel represented as H1, and the station A transmits signals to the station U over a wireless channel represented as H2, wherein,
    a. station U estimates the channel H2, using pilots in the signal, and interpolates it, to obtain estimate of H2 for plurality of sub-carriers, and,
    b. station U transmits data to station A by sending special pilots scaled by a scaling factor that is related to H2, and represented by f(H2), and,
    c. station A estimates the channel H1 from the regular pilots, and estimates H1*f(H2) from special pilots, and then interpolates these quantities over the plurality of sub-carriers, to obtain an estimate of H1 and H1*f(H2) for the plurality of sub-carriers, and,
    d. station A calculates as estimate of f(H2), and in some instances an estimate of H2, for the plurality of sub-carriers.

7. The method of claim 6 wherein station A after estimating value of f(H2), scales the sub-carriers in the signal it transmits to station U by a scaling factor related to f(H2).

8. The method of claim 6, wherein, station A is communicating with stations other than station U, over different set of sub-carriers, and the other stations processes signals using the approach of station U, for corresponding set of sub-carriers.

\* \* \* \* \*